(12) United States Patent
Riha

(10) Patent No.: US 7,980,767 B2
(45) Date of Patent: *Jul. 19, 2011

(54) OPTICAL FIBER CONNECTION SYSTEM

(75) Inventor: William Riha, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/605,060

(22) Filed: Oct. 23, 2009

(65) Prior Publication Data

US 2010/0040330 A1 Feb. 18, 2010

Related U.S. Application Data

(63) Continuation of application No. 12/207,397, filed on Sep. 9, 2008, now Pat. No. 7,628,544, which is a continuation of application No. 11/751,423, filed on May 21, 2007, now Pat. No. 7,435,009.

(51) Int. Cl.
*G02B 6/36* (2006.01)

(52) U.S. Cl. .............................. 385/53; 385/54; 385/55
(58) Field of Classification Search .................... 385/53, 385/54, 55
See application file for complete search history.

(56) References Cited

U.S. PATENT DOCUMENTS

| 6,952,082 | B2 * | 10/2005 | Schmitkons et al. | 315/149 |
| 7,435,009 | B1 * | 10/2008 | Riha | 385/53 |
| 7,628,544 | B2 * | 12/2009 | Riha | 385/53 |

* cited by examiner

*Primary Examiner* — Jennifer Doan
(74) *Attorney, Agent, or Firm* — Jackson Walker L.L.P.

(57) ABSTRACT

An optical fiber connection system detects when proper connection is made between a fiber-optic cable and a bulkhead. A conductive strip on the fiber-optic cable contacts a first and second conductor on the bulkhead upon proper positioning of the bulkhead relative to the fiber-optic cable. The system includes indicators for displaying which of a plurality of termination points is properly terminated. In addition, the system includes alternative embodiments for turning off an energy source feeding the fiber-optic cable, in the event the fiber-optic cable becomes disconnected from the bulkhead.

18 Claims, 4 Drawing Sheets

OPTICAL FIBER CONNECTION SYSTEM

BACKGROUND

1. Field of the Disclosure

The present disclosure relates to connector systems, and more specifically, to optical fiber connector systems.

2. Description of Related Art

It is sometimes important to determine when proper connection has been made between a bulkhead and a fiber-optic cable. For example, troubleshooting operability of telecommunications equipment such as a cross-connect panel that uses fiber-optic jumpers sometimes requires verification of proper termination. In addition to troubleshooting, it may be important to know when a fiber-optic cable has become disconnected from a bulkhead, so that a system can automatically terminate the transmission of light through the fiber-optic cable. For example, if a high-power laser transmitter or fiber-optic amplifier is turned on when a fiber-optic cable becomes disconnected, it would be useful to have automatic detection of the disconnected cable to prevent unwanted transmission of high-power energy.

DESCRIPTION OF EMBODIMENT(S)

An optical fiber connector system is needed that detects proper connection between a fiber-optic cable and a bulkhead. Such a system can aid troubleshooting and, alternatively, provide monitoring of an inventory of cross-connect terminations, for example.

In one aspect, an optical fiber connection system includes a fiber-optic cable and a bulkhead. The fiber-optic cable has a connector body that may be adapted for holding a ferrule. The bulkhead includes a first and second conductor and the fiber-optic cable includes a third conductor. The third conductor has a first end and a second end. The first end of the third conductor is positioned to contact the first conductor of the bulkhead upon proper connection between the bulkhead and the fiber-optic cable. Similarly, the second end of the third conductor is positioned to contact the second conductor of the bulkhead upon proper connection between the bulkhead and the fiber-optic cable.

In another aspect, a system of connecting fiber-optic cables including a first fiber-optic cable is disclosed. The first fiber-optic cable includes a body having a first conductor strip having a first end and a second end. The system further includes a bulkhead for receiving the fiber-optic cable. The bulkhead has a first conductor and a second conductor. Upon proper connection between the first fiber-optic cable and the bulkhead, the first end of the first conductor strip contacts the bulkhead's first conductor and the second end of the first conductor strip contacts the bulkhead's second conductor.

Figure 1:
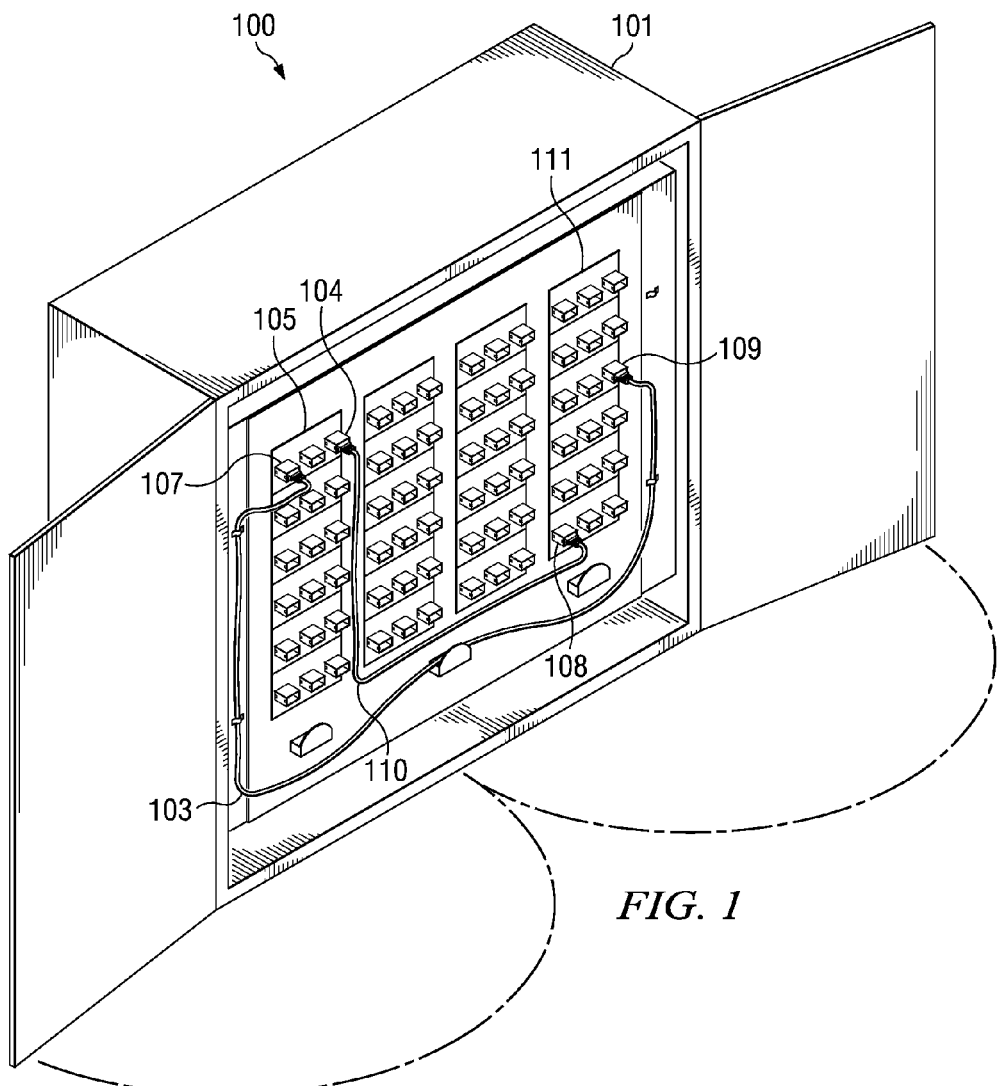
FIG. 1 depicts a connection cabinet housing a cross-connect panel which utilizes one or more embodied optical fiber connection systems.

FIG. 1 illustrates an assembly 100 for use in conjunction with a plurality of optical fiber connection systems. Assembly 100 as depicted includes connection cabinet 101, which includes a first connection panel 105 and a second connection panel 111. First connection panel 105 includes a termination bulkhead 107 and a termination bulkhead 104. Second connection panel 111 includes a termination bulkhead 109 and a termination bulkhead 108. A cross-connect patch cord 103, as shown, is connected between termination bulkhead 107 and termination bulkhead 109. A cross-connect patch cord 110 is connected between termination bulkhead 104 and termination bulkhead 108.

Figure 2:
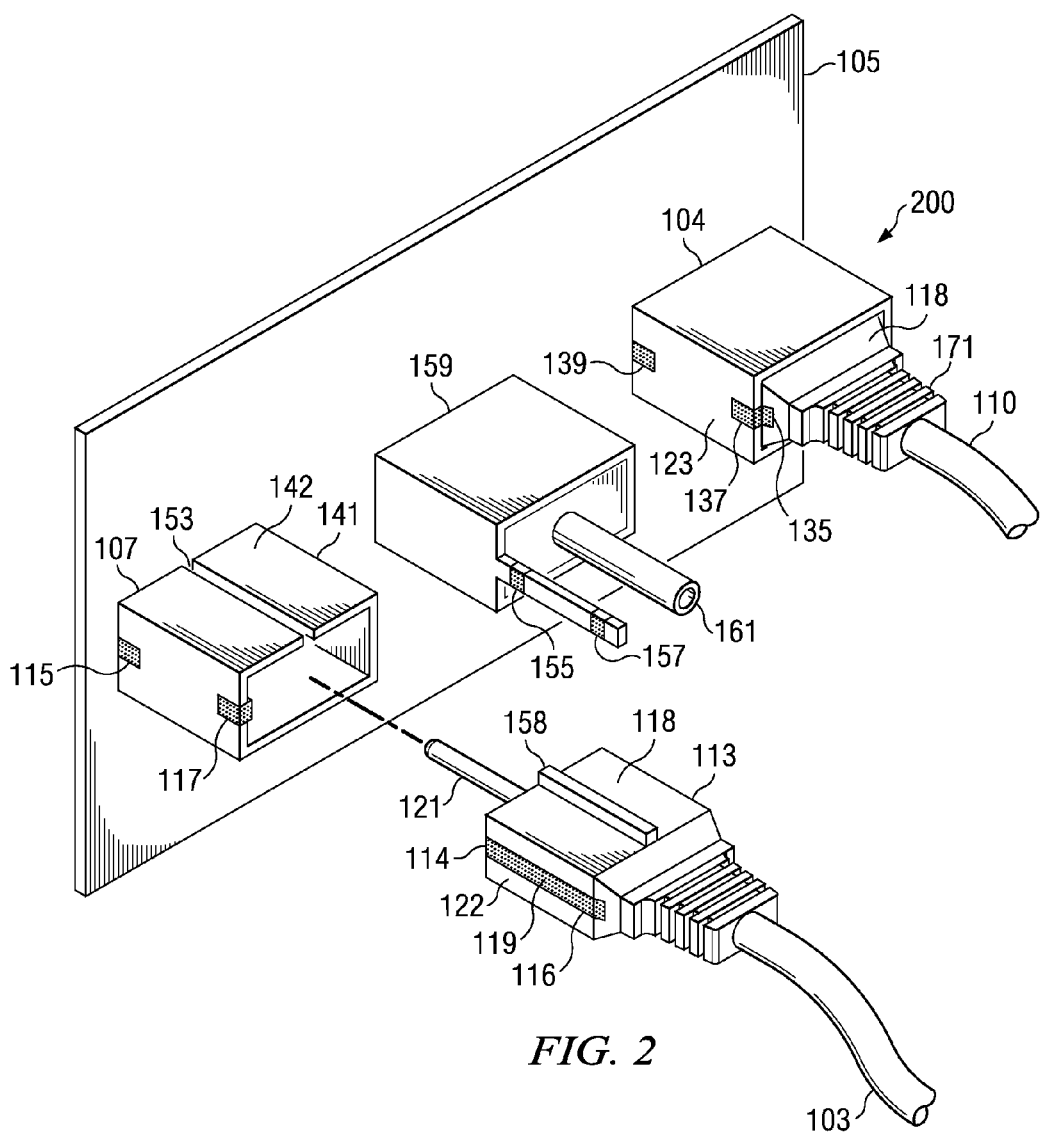
FIG. 2 depicts a close-up of the cross-connect panel from FIG. 1 illustrating alignment between a fiber-optic cable and a bulkhead in an embodied system.

FIG. 2 depicts a detailed view of an embodied optical fiber connection system 200 implemented in conjunction with the first connection panel 105 of FIG. 1. In FIG. 2, one instance of connection system 200 includes termination bulkhead 104 and a connector body 118 of cross-connect patch cord 110. In this arrangement, bulkhead 104 is adapted to receive connector body 118 in a male-female configuration, in which bulkhead 104 is female and connector body 118 is male. Fiber-optic cable 110, as shown, also includes a strain relief boot 171 between fiber-optic cable 110 and connector body 118. Termination bulkhead 104, as shown, includes a first conductor 139 and a second conductor 137. First conductor 139 is an electrically conductive element that may be imbedded in a sidewall 123 of bulkhead 104. In some embodiments, first conductor 139 extends through sidewall 123 so that first conductor 139 maybe be contacted from within an interior space defined by first conductor 139. In some embodiments (not shown), first conductor 139 does not extend entirely through sidewall 123. For example, first conductor 139 may be contacted from the interior of bulkhead 104, but not from the exterior. As implemented in FIG. 2, FIG. 3, and FIG. 4, described below, first conductor 139 is floating or electrically isolated when no connector body, such as connector body 118, is received within bulkhead 104.

Figure 3:
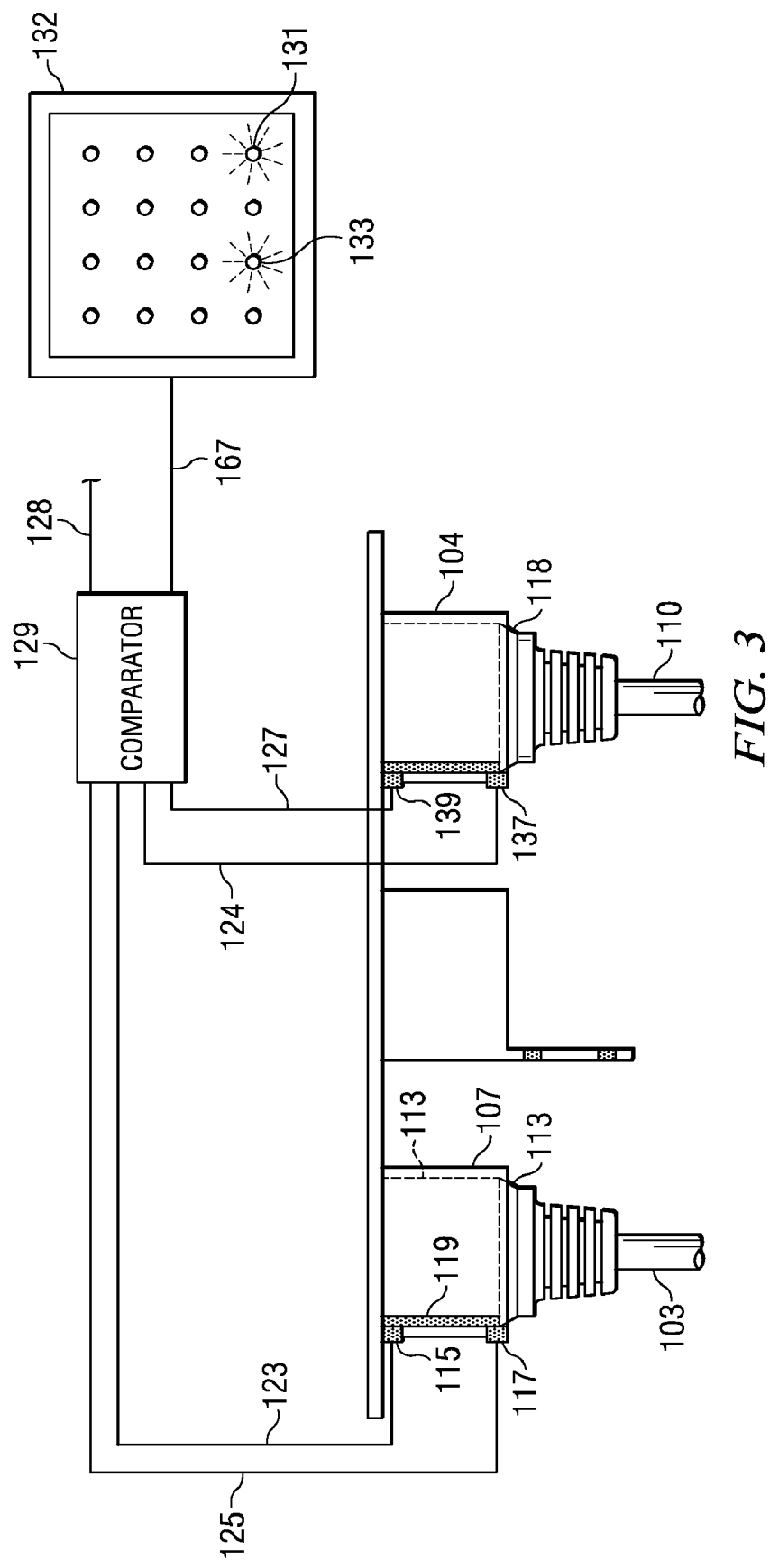
FIG. 3 illustrates an embodied system including a comparator and a display for indicating when proper connection is made between fiber-optic cables and bulkheads.
Figure 4:
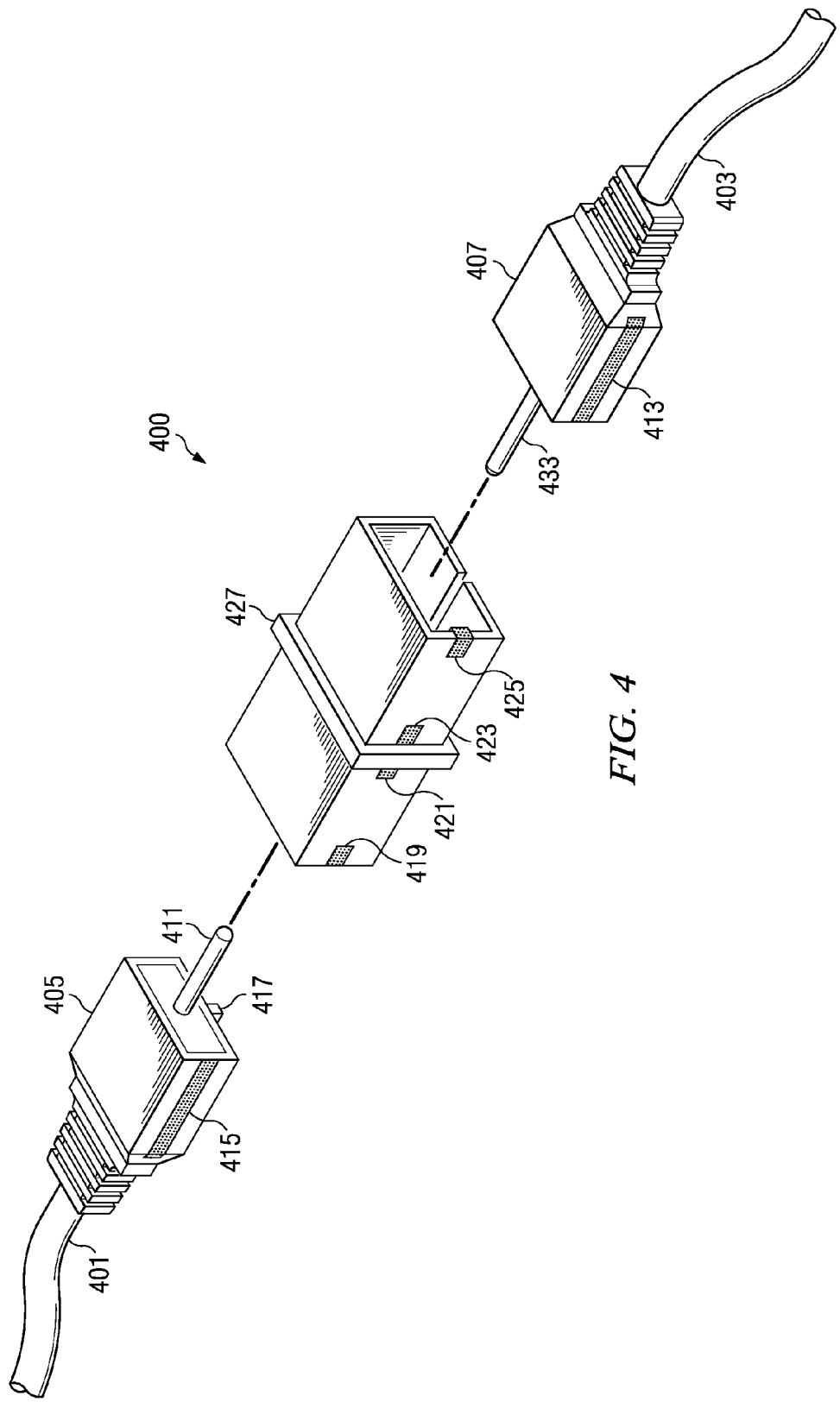
FIG. 4 illustrates an alternate embodiment for terminating fiber-optic cables to a bulkhead.

Second conductor 137 may be similar in material and dimension to first conductor 139. As depicted in FIG. 2 through FIG. 4, second conductor 137 is positioned within sidewall 123 at an end opposite the end at which first conductor 139 is positioned. Second conductor 137, as shown, is electrically isolated when connector body 118 is not properly received into bulkhead 104.

Connector body 118 includes a conductor strip 135, of which only one end is visible in FIG. 2. As implemented in FIG. 2 through FIG. 4, conductor strip 135 is an electrically conductive element attached to, or embedded in and extending the length of, a sidewall of connector body 118. In this arrangement between connector body 118 and termination bulkhead 104, upon proper termination of connector body 118 into termination bulkhead 104, conductor strip 135 provides electrical continuity between first conductor 139 and second conductor 137. Such an arrangement, for example, allows for detection and indication of proper termination of cross-connect patch cord 110.

FIG. 2 illustrates other aspects of some embodied fiber connection systems. For clarity, cross-connect patch cord 103 is shown separated from bulkhead 107. Termination bulkhead 107 includes a first conductor 115 and a second conductor 117, which are electrically conductive elements analogous to conductors 139 and 137. Termination bulkhead 107 has a body 141, which could be made of an electrically non-conductive material. Alternatively, if body 141 were made of conductive material, body 141 could require some form of electrical isolation from first conductor 115 and second conductor 117. Cross-connect patch cord 103 includes a connector body 113, a ferrule 121, and a conductor strip 119 attached to or embedded in a sidewall 122 of body 113. Conductor strip 119 includes a first end 114 and a second end 116. As shown, because cross-connect patch cord 103 is not properly terminated into bulkhead 107, first end 114 of conductor strip 119 does not contact first conductor 115. Similarly, second end 116 of conductor strip 119 does not contact second conductor 117. Accordingly, as shown in FIG. 2, first conductor 115 and second conductor 117 are electrically isolated or electrically discontinuous.

Upon proper termination (not shown) of connector body 113 into bulkhead 107, first end 114 of conductor strip 119 contacts first conductor 115 and second end 116 of conductor strip 119 contacts second conductor 117. Accordingly, proper termination of cross-connect patch cord 103 results in electrical continuity between first conductor 115 and second conductor 117. This electrical continuity can be sensed by detectors, comparators, processors, and other circuitry and used to indicate when proper termination has occurred, or if proper termination has ended. In an alternative embodiment, conductor body 113 could be made of metal or some other conductive material, and first conductor 115 could be positioned (not shown) such that it contacted the most foregoing portion of connector body 113 only upon proper insertion of connector body 113 into termination bulkhead 107. In this arrangement, rather than having a conductive strip such as conductor strip 119, the entire body of connector 113 would serve to provide a conductive path between conductor 115 and conductor 117, thereby allowing for a determination of proper installation of fiber-optic cable 103 to termination bulkhead 107.

Also shown in FIG. 2, some embodiments of the optical fiber connection system include parts to ensure proper orientation between a fiber-optic cable and a termination bulkhead. Specifically, termination bulkhead 107 includes an alignment slot 153 and connector body 113 includes an alignment tab 158. In the depicted embodiment, alignment slot 153 is a gap defined in a top wall 142 of bulkhead 141. Alignment tab 158 as depicted is a parallelepiped element attached to or otherwise connected to a top face 118 of connector body 113. A width of tab 158 is slightly less than a width of alignment slot 153. In this implementation, alignment slot 153 is dimensioned to engage alignment tab 158 snugly when connector body 113 is received in bulkhead 141. Thus, upon coupling connector body 113 to termination bulkhead 107, alignment tab 155 slides into alignment slot 153, ensuring proper orientation of the two parts.

Still further, FIG. 2 illustrates an alternative arrangement for connection between a bulkhead and a fiber-optic cable connector. A termination bulkhead 159 is shown having an alignment sleeve 161 for aligning a ferrule (not shown) of a fiber-optic cable (not shown). Termination bulkhead 159 also includes a first conductor 155 and a second conductor 157. This configuration of termination bulkhead 159 provides an alternative to the arrangement provided by termination bulkhead 104, in which termination bulkhead 104 serves as the female in a male-female configuration. Specifically, termination bulkhead 159's alignment sleeve 161 receives a ferrule (not shown) of a connector body (not shown). In conjunction, first conductor 155 and second conductor 157 are positioned to contact a conductive strip (not shown) from a fiber-optic cable (not shown), to provide a signal that proper termination has occurred between the fiber-optic cable and bulkhead 159.

FIG. 3 illustrates an embodiment using a comparator 129 and a display device 132 for indicating which of a plurality of fiber-optic cables are properly terminated in their corresponding termination bulkheads. As also shown in FIG. 1 and FIG. 2, termination bulkhead 104 is coupled to connector body 118 of fiber-optic cable 110. Similarly, termination bulkhead 107 is coupled to connector body 113 of fiber-optic cable 103. Comparator 129 receives a voltage or other signal from a wire 123 and a wire 125, which are connected a first conductor 115 and a second connector 117, respectively. Upon proper insertion of connector body 113 into termination bulkhead 107, first end 114 (FIG. 2) of conductor strip 119 contacts first conductor 115 and second end 116 (FIG. 2) of conductor strip 119 contacts second conductor 117. Accordingly, conductor strip 119 provides a short-circuit or other form of conductive path between first conductor 115 and second conductor 117. Comparator 129 senses this short-circuit condition between first conductor 115 and second conductor 117 over wire 125 and wire 123. Comparator 129 sends a signal over a wire 167 to trigger a display 132 to illuminate a light 133, or other such indicator.

Similarly, termination bulkhead 104 is properly coupled to connector body 118 of fiber-optic cable 110. Comparator 129 detects over a wire 124 and a wire 127 whether there is a short-circuit condition between first conductor 139 and second conductor 137. Upon a short-circuit condition between first conductor 139 and second conductor 137, comparator 129 sends a signal over wire 167 to display 132 to illuminate an indicator 131.

Also depicted in FIG. 3 is a signal 128 from comparator 129. Signal 128 can be used to turn off a light source, and more specifically, a light source carrying data, in response to information received by comparator 129 regarding the termination status of one or more of a plurality of fiber-optics cables. For example, if comparator 129 detects a loss of the short-circuit condition between first conductor 115 and second conductor 117, comparator 129 could be programmed to send a signal over wire 128 to terminate transmission of light or other energy (not shown) over fiber-optic cable 103. Such an arrangement could be used to prevent unwanted transmission of energy through an optical cable that is not properly terminated and thereby prevent transmission of data over improperly connected optical cables.

FIG. 4 illustrates an alternative embodiment of an optical cable connection system 400. In the depicted embodiment, system 400 includes a termination bulkhead 427 adapted to receive a first connector body 407 from a first fiber-optic cable 403 and a second connector body 405 from a second fiber-optic cable 401. Connector body 405 includes a conductor strip 415, an optional alignment tab 417, and a ferrule 411. First fiber-optic cable 403 includes connector body 407, which includes a conductor strip 413, and a ferrule 433. Upon proper termination of connector body 405 to termination bulkhead 427, conductor strip 415 provides a short-circuit condition (not shown) between a first conductor 419 and a second connector 421. Alignment tab 417, in conjunction with an optional alignment slot (not shown) on termination bulkhead 427, requires proper orientation for termination between connector body 405 and termination bulkhead 427. Similarly, upon proper termination of connector body 407 to termination bulkhead 427, conductor strip 413 provides a short-circuit condition (not shown) between a third conductor 423 and a fourth conductor 425. A comparator (not shown) could be used to sense if there were a short-circuit condition between conductor 423 and conductor 425, thereby determining whether first fiber-optic cable 403 had been properly terminated to bulkhead 427.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the presently claimed subject matter is to be determined by the broadest permissible interpretation of the following claims and their equivalents, and shall not be restricted or limited by the foregoing detailed description.

What is claimed is:

1. A method for detecting a fiber-optic connection, comprising:
   providing a connector body of a fiber-optic cable and an optical bulkhead adapted to receive the connector body, wherein the connector body includes a first conductor and the optical bulkhead includes a second conductor and a third conductor; and
   enabling the connector body to couple to the optical bulkhead, wherein the fiber-optic cable is configured to establish an optical connection to the optical bulkhead, and wherein the second conductor and the third conductor are configured to establish electrical contact with the first conductor.

2. The method of claim 1, further comprising:
   detecting electrical continuity between the second conductor and the third conductor; and
   based on a detected electrical continuity, outputting a signal indicating that the optical connection is properly transmitting optical energy.

3. The method of claim 2, further comprising:
   responsive to the signal indicating that the optical connection is properly transmitting optical energy, activating an energy source associated with the optical connection.

4. The method of claim 1, further comprising:
   detecting electrical incontinuity between the second conductor and the third conductor; and
   based on a detected electrical incontinuity, outputting a signal indicating that the optical connection is interrupted.

5. The method of claim 4, further comprising:
   responsive to the signal indicating that the optical connection is interrupted, deactivating an energy source associated with the optical connection.

6. The method of claim 5, wherein the energy source is an optical energy source.

7. The method of claim 1, further comprising:
   using a comparator coupled to the second conductor and the third conductor to detect electrical continuity with the first conductor.

8. The method of claim 7, further comprising:
   displaying an indication of a detected electrical continuity.

9. The method of claim 7, wherein the comparator detects a voltage across the second conductor and the third conductor.

10. The method of claim 1, further comprising:
    an alignment means for aligning the connector body with the optical bulkhead.

11. A comparator for use with a fiber-optic connection system, comprising a processor programmable to:
    detect a position of a connector body of a fiber-optic cable using two electrodes mounted at a termination bulkhead of the fiber-optic connection system; and
    output a signal indicative of the position of the connector body.

12. The comparator of claim 11, wherein the processor is further programmable to:
    detect the position based on an electrical continuity between the two electrodes and a conductive element included in the conductor body.

13. The comparator of claim 11, wherein the processor is further programmable to:
    detect the position based on an electrical incontinuity between the two electrodes and an insulative element included in the conductor body.

14. The comparator of claim 11, wherein the detected position indicates a degree of optical coupling between the fiber-optic cable and the termination bulkhead.

15. The comparator of claim 11, wherein the processor is further programmable to:
    based on a detected position of the connector body, switch an optical energy source associated with the fiber-optic cable.

16. The comparator of claim 15, wherein the optical energy source is switched on using the output signal when the detected position indicates a successful optical coupling between the fiber-optic cable and the termination bulkhead.

17. The comparator of claim 15, wherein the optical energy source is switched off using the output signal when the detected position indicates an unsuccessful optical coupling between the fiber-optic cable and the termination bulkhead.

18. The comparator of claim 11, wherein the processor is further programmable to:
    repeatedly monitor the two electrodes to detect a change in the position of the connector body.

* * * * *